(12) United States Patent
Ulinski et al.

(10) Patent No.: US 6,700,214 B2
(45) Date of Patent: Mar. 2, 2004

(54) MOBILE POWER GENERATION SYSTEM

(75) Inventors: Richard J. Ulinski, Monrovia, CA (US); Khaliqur Rahman, Lawndale, CA (US); Hugh C. Clarke, Arcodia, CA (US); W. Stephen Heitz, Marina del Rey, CA (US)

(73) Assignee: Aura Systems, Inc., El Segundo, CA (US)

( * ) Notice: Subject to any disclaimer, the term of this patent is extended or adjusted under 35 U.S.C. 154(b) by 0 days.

(21) Appl. No.: 09/939,116

(22) Filed: Aug. 24, 2001

(65) Prior Publication Data

US 2002/0051368 A1 May 2, 2002

Related U.S. Application Data

(63) Continuation-in-part of application No. PCT/US00/03815, filed on Feb. 14, 2000.
(60) Provisional application No. 60/258,917, filed on Dec. 28, 2000.

(51) Int. Cl.$^7$ ................................ H02P 9/04
(52) U.S. Cl. ............... 290/40 C; 290/40 R; 290/40 A; 322/17; 322/22
(58) Field of Search .............. 290/40 R, 40 A, 290/40 C, 40 F; 322/16, 17, 22, 24, 37; 180/60, 65.1, 65.8

(56) References Cited

U.S. PATENT DOCUMENTS

| | | | | |
|---|---|---|---|---|
| 5,255,174 A | | 10/1993 | Murugan ................. | 363/17 |
| 5,545,928 A | * | 8/1996 | Kotani ................. | 290/40 C |
| 5,621,304 A | * | 4/1997 | Kiuchi et al. ............ | 322/18 |
| 5,698,905 A | * | 12/1997 | Ruthlein et al. .......... | 290/32 |
| 5,751,069 A | * | 5/1998 | Rajashekara et al. ...... | 290/40 C |
| 6,021,052 A | | 2/2000 | Unger et al. ............. | 363/26 |
| 6,072,302 A | * | 6/2000 | Underwood et al. ........ | 322/17 |
| 6,198,256 B1 | * | 3/2001 | Miyazaki et al. .......... | 322/16 |
| 6,281,595 B1 | * | 8/2001 | Sinha et al. ............. | 290/40 A |
| 6,326,702 B1 | * | 12/2001 | Yonekura et al. ......... | 290/40 C |
| 2002/0070557 A1 | * | 6/2002 | Geis ..................... | 290/40 R |

* cited by examiner

Primary Examiner—Nicholas Ponomarenko
(74) Attorney, Agent, or Firm—Blakely Sokoloff Taylor & Zafman LLP

(57) ABSTRACT

A power generation system is described for supplying electrical power to a load from at least one of a generator and a battery. The power generation system includes a power bus coupled to the generator and a bi-directional conversion unit coupled between the power bus and the battery. The bi-directional conversion unit is capable of transitioning between a first direction wherein electrical power flows from the power bus to the battery and a second direction wherein electrical power flows from the battery to the power bus.

28 Claims, 12 Drawing Sheets

MOBILE POWER GENERATION SYSTEM

CROSS REFERENCE TO RELATED APPLICATION

This application is a continuation-in-part of PCT Application Serial No. PCT/US00/03815, filed on Feb. 14, 2000 entitled "Mobile Power Generation System" which claims priority from U.S. Pat. No. 6,157,175 filed on Feb. 26, 1999, which applications are each incorporated herein by reference in its entirety.

This application also claims priority from U.S. provisional patent application Ser. No. 60/258,917 filed on Dec. 28, 2000 entitled "Inverter and DC Power Upgrade to Mobile Power Generation System."

BACKGROUND

1. Field of the Invention

This invention generally relates to the field of electric power generation and electric power conversion, and in particular to a system for maintaining the voltage level of a power supply bus coupled to a load.

2. Description of the Related Art

The need for mobile commercial-grade alternating current (AC) power comes in many applications and cuts across many industries. There is an emerging need for a mobile power generation system that can satisfy the demands of power hungry machinery, like heavy construction tools, while still being capable of delivering well-regulated power to sensitive equipment, like computers. Moreover, not only should the mobile system have the capacity to generate such power while operating at a stationary site, it should also provide the same type of power while the system is in transit. For example, a mobile power generation system should be versatile enough to support the power requirements of emergency response vehicles rendering life-saving services while in transit, as well as satisfy the power demands of sensitive intelligence/news-gathering computer and telecommunications equipment in isolated regions of the world.

There is also a need to provide this same AC power during occasions when the running of the vehicle's engine is not desirable. Late night work in residential areas, where engine noise is an issue, is an example of one such occasion. Generation of power without the need to run an engine is also desirable to reduce air pollution caused by engine exhaust.

One solution for this need is to derive the power from storage batteries, converting the energy from a direct current (DC) source to AC. A device that performs such a function is called an "inverter". Inverters are in the prior art and are commercially available. The conventional inverters typically depend on either the charging system of the vehicle to restore charge to the batteries once they are drained, and/or by a plug-in battery charger. It is common for a vehicle with an inverter to be plugged into standard utility power overnight to "top off" the batteries then depend on the vehicle's alternator to replenish charge level during operation. It is also common for a vehicle to be outfitted with a high output alternator to provide additional charging capacity.

The conventional inverters suffer from various disadvantages. For example, in some of the conventional inverters, the power demands from the inverter exceed by a large margin the ability of an alternator to provide charge. In such a case, there comes a point when the batteries are completely drained, and because of the alternator's inability to keep up alone, inverters shut down and work requiring AC power ceases.

Another disadvantage of the conventional inverter system is that a vehicle alternator produces its least amount of charging current at low engine RPM's. When the batteries are drained, the typical response is to start the vehicle's engine to recharge the batteries with the alternator. At idle RPM the alternator is limited in capacity and will tend to overheat, reducing alternator life and potentially creating a fire danger.

A further disadvantage of the conventional inverter system is that the inverter typically continues to pull power off of the batteries until the batteries are very deeply discharge. Deep discharging of batteries may greatly limit the life of the batteries.

Yet another disadvantage of the conventional inverter system is that the typical automotive alternator recharges based on voltage level only, not battery temperature, which in some cases limits the amount and rate of battery charging and reducing battery life.

Yet another disadvantage of the conventional inverter system is it typically lacks the capability of providing very high power, short duration demands, such as those that occur when starting certain AC electric motors.

SUMMARY OF THE INVENTION

According to one aspect of the invention, a power generation system is provided for supplying electrical power to a load from at least one of a generator and a battery. The power generation system includes a power bus coupled to the generator and a bi-directional conversion unit coupled between the power bus and the battery. The bi-directional conversion unit is capable of transitioning between a first direction wherein electrical power flows from the power bus to the battery and a second direction wherein electrical power flows from the battery to the power bus.

In one aspect of one embodiment, the present invention provides a way to continually supply AC power, even when the generator is no longer producing electrical power, by converting DC power from a battery source into AC power.

In another aspect of one embodiment, the present invention provides a system that transitions between a battery power operation to a generator power operation without AC power interruption.

In another aspect of one embodiment, the present invention provides a smooth transition from a mode where a battery source is supplying power to AC load to another mode where a generator source is supplying power to the AC load.

In another aspect of one embodiment, the present invention is capable of simultaneously supplying DC and AC power without interruption.

In yet another aspect of one embodiment, the present invention provides means for supplying power from both a generator source and a battery source during times of high power demand.

In yet another aspect of one embodiment, the present invention provides an alarm to an operator that the charge levels of the batteries are getting low, providing time for the operator to start the engine and begin recharging the batteries.

In yet another aspect of one embodiment, the present invention monitors battery temperature and adjusts the charging rate accordingly, enhancing battery life and maximizing the amount of useful charge stored in the battery.

In yet another aspect of one embodiment, when the electrical power generated by the generator exceeds the AC load demand, the excess power is used to recharge a battery source.

BRIEF DESCRIPTION OF THE DRAWINGS

The accompanying drawings, which are incorporated in and constitute a part of this specification, explain the object, advantages, and principles of the invention.

DETAILED DESCRIPTION

In the following description, specific details are set forth in order to provide a thorough understanding of the present invention. However, it will be apparent to one skilled in the art that the present invention may be practiced without these specific details. In other instances, well-known circuits, structures and techniques have not been shown in detail in order to avoid obscuring the present invention.

Figure 1A:
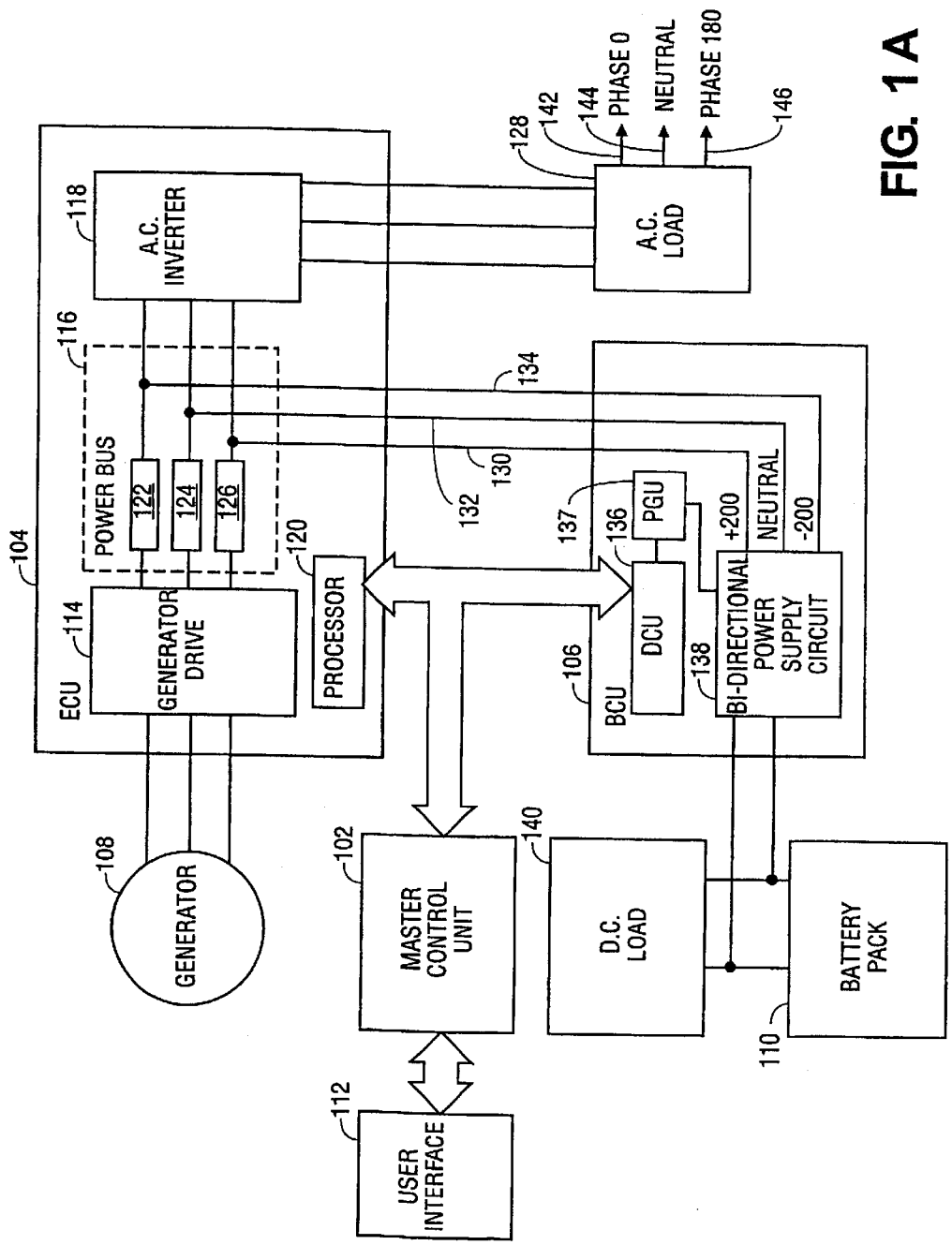
FIG. 1A is a block diagram of a power generation system according to one embodiment of the invention.

FIG. 1A depicts a power generation system according to one embodiment of the present invention. The power generation system includes an electronic control unit (ECU) 104 coupled to a generator 108 to generate power for a power supply bus 116 connected to an AC inverter 118. In one embodiment, the generator is an induction-type generator, requiring an external source of mechanical power to convert into electrical power. For example, the generator may be coupled to an engine of a motor vehicle so that the required mechanical power is supplied by the rotational energy of the engine. Also included in the power generation system is a bi-directional conversion unit (BCU) 106 coupled between the power supply bus 116 and a battery pack 110. The battery pack 110 serves to supply power to the system components when demanded and to store energy generated by the generator when the AC load and DC load demand combined does not exceed the generated power.

A master control unit (MCU) 102 is coupled between the ECU 104 and the BCU 106 to facilitate communication between the ECU and the BCU and to control the activities thereof. A user interface 112 is coupled to the MCU 102. The user interface 112 may include a control panel and a display device. The control panel may include, for example, power meters, on-off/control switches, a heavy duty mode switch (i.e., for accommodating machinery that requires high start-up currents), an emergency/fault condition indicator, and other visual indicators, all of which are well known in the art. The display device may be supplied with various system status data, such as battery voltage, battery current charge or draw rate, total power draw, estimated time to battery discharge, etc. to be displayed on the display device.

In the illustrated embodiment, the ECU 104 includes a processor 120, a generator drive 114, a DC power supply bus 116 and an AC inverter 118. The generator drive 114 is responsive to the amplitude- and frequency-variant signal produced by the generator 108 and is controlled by the ECU processor 120 to maintain the DC power supply bus 116 at a desired DC voltage level. The AC inverter 118 produces AC output power by converting the DC voltage supplied by the power bus 116 into an AC power signal. It should be noted that the power bus 116 supplying power to the AC inverter 118 derives its electrical power from the generator 108, the battery pack 110 or both. However, the function of AC inverter 118 is not affected in any way by the source of the bus voltage. Because of this, the AC output will be constant and unaffected by transitions between a generator power source and a battery power source, providing the seamless AC operation required of the present invention between vehicle engine on and vehicle engine off operation.

In one embodiment, the power supply bus 116 includes a positive DC bus 126, a negative DC bus 122 and a neutral rail 124. The positive DC bus 126 may comprise a plate of a capacitor or a respective plate of each one of several capacitors which are connected in parallel, with the other plate or plates coupled to the neutral rail 124. Similarly, the negative DC bus 122 may comprise a plate of a capacitor or a respective plate of each one of several capacitors which are connected in parallel, with the other plate or plates coupled to the neutral rail 124. In one embodiment, the power generation system is configured to maintain 400 Volts across the positive DC bus 126 and the negative DC bus 122.

When the engine is on and the generator 108 is generating power, the generator drive 114 attempts to regulate the electrical power produced by the generator such that a desired voltage level across the power supply bus 116 is achieved. In one embodiment, the generator drive 114, responsive to control signals received from the ECU processor 120, attempts to regulate the electrical power produced by the generator 108 such that the DC power bus 116 is maintained at a nominal voltage of positive 200 VDC and negative 200 VDC with respect to the neutral rail 124. The neutral rail 124 allows the generation of a combination of 120 VAC and 240 VAC signals without requiring an output transformer. In one embodiment, the AC inverter 120 converts the positive 200 VDC and negative 200 VDC into a plurality of AC output power signals, such as for example, two 120 VAC, 60 Hz signals, 180° out of phase. The voltage between the two signals is rated at 240 VAC while the voltage between each signal and a neutral rail 131 is 120 VAC. The AC inverter 120 supplies the plurality of output AC power signals to the AC load.

The power generation system may be configured to automatically activate the AC inverter 118 to produce AC power upon engine startup. Alternatively, the system may be configured to enable the AC inverter 118 to be manually activated by an operator. In such a case, if the AC inverter 118 is not started automatically, activation occurs manually through an on/off switch located on the control panel of the user interface 112.

At initial start-up of the system, there exists no voltage on the DC power supply bus 116. In one embodiment, the generator is an induction-type generator and lacks self-excitation and the lack of DC voltage on the power supply bus 116 precludes the generator drive 114 from developing or applying any current for the generator stator field coils. Thus, shortly after initial start-up, the system switches electrical power from the battery pack 110 to the generator drive 114 via the power supply bus 116 to enable the generator drive to apply sufficient current to drive the generator. Alternatively, the generator drive 114 may receive power from other battery storage source. Once the generator drive 114 has been supplied with adequate power, the generator drive develops a current for the generator stator field coil windings. Using the electrical power generated by the generator 108, the ECU 104 is able to charge the power supply bus 116. When the voltage of the power supply bus 116 is sufficient for the generator drive 114 to develop current for the generator stator field coils, the system may disable the flow of electrical power from a battery storage source to the generator drive 114.

According to one aspect of the invention, the power generation system monitors, among other things, the voltage levels of the power supply bus 116 and maintains the power bus at a desired voltage range by regulating the flow of power between the power supply bus and the battery pack via the BCU 106. The BCU 106 includes a pulse width modulation generation unit (PGU) 137, a digital signal processor based control unit (DCU) 136 and a bi-directional power supply circuit 138. The DCU 136 is configured to continuously monitor the various signals including voltage level of the power supply bus 116 and compute required commands values for the PGU 137 to maintain adequate energy flow between two sides of the bi-directional power supply circuit 138 for the desired set parameters of the system in terms of voltages and currents.

In one embodiment, the DCU 136 determines the appropriate command values to the PGU 137 by comparing the voltage levels on the power bus 116 and the battery pack 110 or DC load 140, with reference set-points. These set-points may include charging and over-discharge voltages for battery under different conditions like temperature, reference for power bus voltage generated by the induction generator 108, reference minimum voltage maintained on the power bus 116 by the battery. Other reference set-points the DCU 136 may use include power level versus RPM for induction generator 108, current rise limits to and from the battery 110 or DC load 140, maximum charging rate for the battery 110.

In accordance with one aspect of one embodiment, the bi-directional power supply circuit 138 is capable of transitioning, in a continuous manner, between a first direction wherein electrical power flows from the battery to the power bus and a second direction wherein electrical power flows from the power bus to the battery. The direction and the amount of electrical power, flowing through the bi-directional power supply circuit between the battery and the power bus, are determined based on various parameters. The smooth transition from one direction to the other direction enables the bi-directional power supply circuit to effectively distribute the power provided by the AC and/or DC electrical power sources to AC and/or DC loads without interruption.

In one embodiment, pulse width and timing of control signals applied to the switching elements of the bi-directional power supply circuit 138 is adjusted in a continuous manner to maintain the voltage level of the power bus within a desired range. The direction and the amount of the energy flow between the battery and the power bus may be determined by comparing the bus voltage level with upper and lower threshold values. In one implementation, the upper threshold value is set slightly below the power bus voltage level maintained by the ECU 104 when the generator 108 is actively generating power. When the power bus voltage level exceeds the upper threshold value, width and timing of control pulses applied to the switching elements of the bi-directional power supply circuit 138 will be appropriately adjusted such that the power from the power supply bus can be converted to an adequate battery charge voltage level to recharge the battery pack 110. If the generator 108 is de-activated, for example because the vehicle's engine is turned off, the ECU 104 will no longer receive the generator power necessary to maintain a desired power bus voltage level, causing the power bus voltage level to fall. When the power bus voltage level drops below a lower threshold value, the width and timing of control pulses applied to the switching elements of the bi-directional power supply circuit will be appropriately adjusted such that the power from the battery pack 100 can be converted into an adequate bus voltage level to charge the power bus to a desired bus voltage level.

One advantage obtained by the invention occurs during times of high surge current demand. With the generator 108 activated, the AC load 128 may include a device that requires a large initial current, such as in the case with certain AC motors. When this occurs, the power demand may exceed the capacity of the generator 108, resulting in a drop of the power bus voltage level. In one embodiment, when the power bus voltage level falls below the lower threshold value, the BCU will smoothly transition the flow of electrical power through the bi-directional power supply circuit 138 to prevent the power bus voltage level from decreasing further. Since the lower threshold voltage value is set above the point where AC load voltage is effected, a brownout condition may be avoided. The AC power supplied to the AC load may be derived from both the generator 108 and the battery pack 110, resulting in an extremely stable source of power that is not only beneficial but necessary in many applications. Once the generator 108 catches up with the load demand, the generator drive 114 will bring the power bus voltage level above the upper threshold value, which will in turn transition the bi-directional power supply circuit 138 to direct electrical power from the power bus to the battery pack.

Another advantage obtained by the invention is the management of the vehicle engine idle speed (e.g., engine RPM). Through an idle control system that is customized for each vehicle, the ECU 104 has the ability to modify the engine idle RPM to maintain minimum generator rotational rates. Increasing idle RPM also puts the engine in a power band that is more suitable for generating the required horsepower necessary for generator operation.

In one embodiment, if a sudden, high power demand is placed on the system, the generator drive will not result in a sudden torque applied to the vehicle's engine. In this regard, the additional power required during a load surge on the power bus 116 may be supplied by the battery pack 110 via the bi-directional conversion unit (BCU) 106. Advantageously, such arrangement of the invention prevents a sudden torque applied to the engine caused by the generator drive demanding additional power from the generator, thus avoid experiencing the reduction in engine RPM as a result of sudden torque applied to the engine. According to one embodiment of the invention, as the overall system reacts to the increased load, the torque applied by the generator 108 to the engine will occur gradually, allowing the power generation system to change the engine idle slowly and preventing RPM overshoot. This is important for applications that require power while the vehicle is being driven, such as would be the case in recreational vehicles and the like.

In one embodiment, a feed-forward control logic is implemented in the BCU. The feed-forward control logic provides near zero delay in restoring power from the battery under conditions due to either surge in AC load 128 or quickly decreasing the amount of power from the generator 108, for example, when the engine is turned off. Since the BCU 106 does not need to switch modes under these conditions, the battery power is instantaneously available to supply power to the load. This feature of the invention greatly simplifies load transient handling and provides seamless transition for energy flow. In fact, it allows the battery pack 110 to act as a direct storage element in stabilizing the power bus 116.

To compensate for increase in load demand, the generator drive 114 is capable of adjusting the output power of the generator 108 by modifying the applied AC voltage level to the generator stator coils while maintaining optimum slip. The "slip," expressed as a percentage, is defined as the slip frequency divided by electrical frequency applied to the stators. The slip frequency is the difference between the mechanical frequency—a function of rotor speed—and the electrical frequency. By adjusting the electrical frequency, the slip can be adjusted thereby minimizing the magnitude of the currents in the rotor disk and in the stator coils.

In one embodiment, the BCU processor 136 is configured to monitor the rotational speed of the generator 108 and an AC load and a DC load applied to the system as well as monitoring the voltage level of the power supply bus 116. The generator 108 speed may be determined by a generator rotational speed sensor. The generator speed sensor may be any type of sensor that determines RPMs, such as a hall effect sensor mounted directly onto the generator. Based on this information, the BCU processor 136 coordinates with the MCU 102 and the ECU processor 120 to send appropriate control signals to the generator drive 114 to maintain the power supply bus at a desired voltage level through the power adjustments of the generator 108. Although illustrated as a separate component for purposes of illustration, it will be appreciated that the function of the ECU processor 120, the BCU processor 136 and the MCU 102 may be implemented in a single processor.

One way the system maintains the voltage level of the power bus at a desired range is by continuously monitoring the voltage levels of the power bus and adjusting the electrical power produced by the generator by virtue of the generator drive. In one implementation, when the voltage level of the power bus drops as a result of power drawn from the system, the stored electrical power from the battery pack is initially used to supply power to the power bus, then the generator drive 114 varies the current within the stator field coils in order to adjust the generator electrical power to produce sufficient power to maintain the power bus within a desired voltage range. According to one aspect of one embodiment, the battery power may be used to compensate for drop in the voltage level of the power bus in various situations, including (1) when load demand increases, (2) when the power bus is experiencing a load surge, i.e., when a sudden, high power demand is placed on the system, or (3) when the engine is running at low RPM in the drive mode.

In operation, when AC load 128 and DC load 140 are applied to the system, the power is drawn from the power supply bus 116. If the power drawn from the system exceeds the electrical power supplied by the generator and the battery pack, the BCU 106, detecting the drop in the power bus voltage level and measuring the load, will determine if the generator 108 is capable of generating the additional electrical power required by the load at the present generator rotational speed. If the current rotational speed of the generator 108 is sufficient to meet the load demand, the generator drive 114, responsive to control signals sent by the ECU processor 120, will cause the generator to produce enough power to compensate for the extra power drawn from the system. This can be achieved by the generator drive 114 increasing the AC voltage level applied to the generator stator coils while maintaining optimum slip. When the applied load is disconnected from the power generation system or is turned off, the power bus voltage level will rise above the desired voltage level and the generator drive 114 will react by modifying current within the stator field coils to reduce the generator electrical signal power production and bring the power bus voltage level back down. If the current rotational speed of the generator 108 is inadequate to meet the load demand, the ECU processor 120 may send appropriate control signals via the MCU 102 to increase the speed the engine by opening up the engine idle or electronic means.

To avoid exceeding the overall power capability of the system, the power generation system controls the AC and DC power drawn from the system. For example, if an operator chooses AC priority, the DC power output 140 will be automatically reduced as the AC load 128 demand increases such that the total power does not exceed maximum. The converse is true for a DC priority system.

In one embodiment, the power generation system is configured to monitor the voltage level of the battery pack 110 and indicate to the operator when the batteries are nearly discharged, allowing the operator time to start the engine so that generator 108 can directly supply the necessary AC power and DC power for recharging battery pack. In one embodiment, if the battery voltage falls below a pre-programmed discharged voltage, the system will shut down to avoid a possibility of damaging the battery caused by excessive drainage and indicate that the system has shut down due to low battery voltage on the control panel of the user interface 112.

Figure 1B:
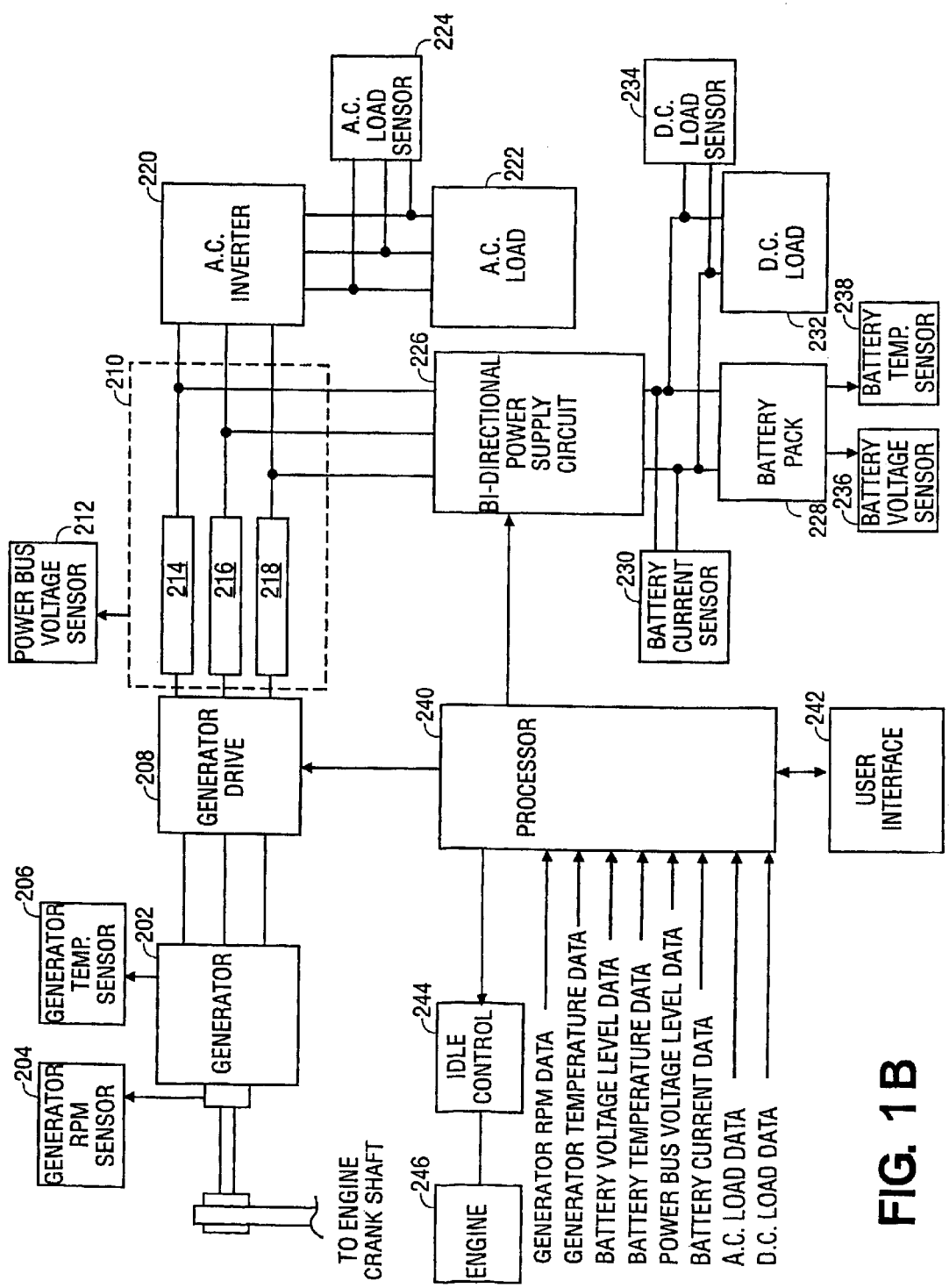
FIG. 1B is a block diagram of a power generation system according to another embodiment of the invention.

FIG. 1B depicts a power generation system according to another embodiment of the present invention. The major components of the power generation system include a generator 202, a generator drive 208, a power supply bus 210, an AC inverter 220, a bi-directional power supply circuit 226, a battery pack 228 and a processor 240. The generator may be an induction-type generator, which derives its required mechanism power from an engine 246 to convert the rotational energy of the engine into electrical power. In one embodiment, the generator 202 is driven by an engine 246 of a motor vehicle. The power generation system has numerous applications and may be used in any type of vehicles having an engine suitable for driving a generator. Alternatively, the power generation system of the invention may be used as a stand-alone power generation system. The generator drive 208 coupled to the generator 202 is configured to control amount of electrical power generated thereby. In this regard, the generator drive 208, in response to commands received from the processor 240, selectively adjusts the power produced by the generator 202 by varying the current within the stator field coils of the generator and optimizing the operating slip frequency.

In this embodiment, the power generation system employs a number of sensors to monitor various parameters within the system. The generator 202 is provided with an RPM sensor 204 and a thermal sensor 206. The battery pack 228 is provided with a voltage sensor 236 and a thermal sensor 238. A voltage sensor 212 is coupled to the power supply bus 210 to monitor the voltage level thereof. A current sensor 230 is coupled between the bi-directional power supply circuit 226 and the battery pack 228 to monitor the battery charge current and battery discharge current. Additionally, load sensors 224, 234 are coupled to the AC load 224 and the DC load 232 to monitor the load demands thereof. The output signals from these sensors are input into the processor 240. Based on the output signals received from these sensors, the processor 240 is configured to dispatch control signals to the generator drive 208, the bi-directional power supply circuit 226 and the idle control 244 to maintain the power bus voltage level within a desired voltage range.

In operation, when the engine 246 is off and the generator 202 is not generating power, the electrical power demanded by the AC and DC loads 224, 232 will be supplied by the battery pack 228. To supply the power to the AC load 224, the bi-directional power supply circuit 226, responsive to control signals received from the processor 240, enables the electrical power from the battery pack 228 to be used to charge the power supply bus 210. Once the power bus 210 is sufficiently charged, the electrical energy from the power bus is used to drive the AC inverter 220, which converts the received DC voltage from the power bus into an AC power signal.

To ensure that the system can match the power being drawn from the system, the processor 240 monitors the AC load 222, the power bus voltage level and the battery voltage level. As long as certain conditions are met, the processor 240 will attempt to maintain the power bus voltage level within a desired voltage range. For example, by monitoring the battery voltage level data from the battery voltage sensor 236, the processor 240 is able to determine whether the battery pack 228 can continue to support the load demanded by the AC and DC loads. If the battery voltage level falls below a defined voltage level, the processor will activate an alarm to warn that the system is about to shut down. In such a case, if the battery voltage level continues to fall below a certain level, the processor 240 will shut off the system by switching off the bi-directional power supply circuit 226 to avoid damaging the batteries caused by excessive drainage. The switching off the bi-directional power supply circuit 226 will cause the power bus voltage level to drop, which in turn will cause the AC inverter 220 to turn off.

Additionally, the processor 240 is also configured to monitor the battery current data from the battery current sensor 230 to ensure that battery charge current and battery discharge current are within an allowable range. If the battery pack 228 is used to supply the AC load and the battery discharge current exceeds a certain level, the processor 240 will instruct the bi-directional supply circuit 226 to shut off for safety reasons and to avoid damaging any internal components. When charging the battery pack 228, if the battery charge current is exceeds a certain level, the battery charge current will be adjusted down by the bi-directional power supply circuit 226, in response to control signals received from the processor, to avoid damaging the batteries in the battery pack and other components. In one implementation, the upper limit of the battery charge current is set at 200 amps.

When the engine 246 is on and the generator 202 is generating power, the electrical power demanded by the AC and DC loads 224, 232 will be supplied by the generator, the battery pack 228 or both. When the AC inverter 220 is turned off, all power produced by the generator 202 will be used to recharge the battery pack 228. When the AC inverter 220 is turned on, the generator power will supply the AC load 224 and any remaining power that the AC load does not require will be used to recharge the battery pack 228. If needed, the battery power may be used to supplement the power being drawn by the AC load.

To maintain the power supply bus within a desired voltage range, the processor 240 continuously monitors the voltage level of the power supply bus 210. This voltage detection is performed according to the output data from the power bus voltage sensor 212. Then, the processor 240 determined whether the detected voltage level of the power bus is within upper and lower threshold voltage values. Based on this information, the processor 240 controls the direction and the amount of electrical power flowing through the bi-directional power supply circuit 226 between the battery pack 228 and the power supply bus 210.

When the detected power bus voltage level exceeds an upper threshold value, the bi-directional power supply circuit 226, responsive to control signals received from the processor, will use the electrical power from the power bus to recharge the storage batteries in the battery pack 228. When the detected power bus voltage level drops below a lower threshold value, the processor will convert DC battery voltage from the battery pack 228 to supply the power bus 210 with electrical power via the bi-directional power supply circuit. Accordingly, by controlling the direction and the amount of electrical power flowing through the bi-directional power supply circuit 226 in a continuous manner, the voltage level of the power bus can be maintained within a desired range without changing the rotational speed of the engine so long as the power being drawn from the system does not exceed the power produced by the generator and the battery pack.

If the power being drawn from the system exceeds the power produced by the system, this will cause the power bus voltage level to continue to drop. In such a case, the processor 240 examines the rotational speed of the generator to determine if at the current rotational speed, the generator is capable of generating the additional power required the AC and DC loads. This generator rotational speed is detected according to the output data from the generator RPM sensor 204. If the detected rotation speed of the generator 202 is sufficient to meet the load demand, the generator drive 208, responsive to commands from the processor 240, will respond by varying the AC voltage level applied to the stator field coils of the generator unit while maintaining optimum slip to produce enough additional power in the generator electrical signal to bring the power bus back up to a desired voltage level. Conversely, when the load 224, 232 is disconnected from the system or turned off, the power bus voltage level will rise above its desired level and the generator drive will react by modifying current within the stator field coils to reduce the generator electrical signal power production and bring the voltage back down.

In one embodiment, the processor 240 examines the battery voltage level as well as how much power the generator is capable of generating based on the RPM to determine if the system is capable of matching the power demanded by the AC and DC loads. If at the current RPM, the generator 202 is capable of generating more power than required by the AC load 222, any access will be used for recharging the battery pack 228. For example, if the generator is producing 5 kwatts and AC load is 4 kwatts, the processor will control the bi-directional power supply circuit such that only 1 kwatt goes to the battery. On the other hand, if the electrical power demanded by the AC load 222 is greater than what the generator is capable of generating at the current RPM, the battery pack 228 will supply the extra power required by the AC load via the bi-directional power supply circuit 226. If the AC load 222 is greater than power supplying capability of both the generator 202 and the battery 228 combined, the processor 240 may control the vehicle engine throttle via the idle control 244 to match the power demanded by the AC load 222. However, if the power drawn from the system exceeds the power supplied by the battery pack 228 and the generator producing power substantially at its maximum capacity, the AC inverter will shut down with a fault, for example, by tripping a circuit breaker.

As noted above, the processor 240 is configured to control the vehicle engine RPM via the idle control 244 based on the AC and DC load requirements and the charged voltage level of the battery. For example, if the processor 240 determines that the battery is fully charged and the load requirement is relatively low, the current rotational speed of the engine will not be effected by the processor 240. However, as the load demand increases, the processor 240 may command the idle control 244 to increase the engine RPM in order to satisfy the DC and AC loads. More specifically, if the detected rotation speed of the generator 202 is insufficient to meet load demand, the processor 240 may instruct the idle control 244 to increase the rotational speed of the engine. The idle control 244, responsive to control signals received from the processor, operates to adjust the generator rotational speed by manipulating the throttle or electronic idle control means of the vehicle engine 246. In one implementation, the idle control 244 is operated by the processor 240 only when the vehicle is stationary or parked and is disabled when the vehicle is being driven. The idle control 244 may be any conventional actuator commercially available for throttle positioning. In cases where relatively powerful engines are utilized, such as medium and heavy-duty diesel engines, adjustments of the engine speed by the processor 240 may not be necessary in order to satisfy the loads.

In one embodiment, the processor 240 is configured to regulate the amount of AC and DC power applied to the loads 222, 232 so that the overall power supplying capability of the system is not exceeded. In AC priority operation, the processor will reduce the amount of DC provided for battery charging if the AC demand increases. For example, if the capacity of the generator is 5,000 watts continuous and 4,000 watts is required to operate AC equipment, after initial surge the DC output would be reduced to 1,000 watts in steady state operation. Similarly, if the processor is set up for DC priority operation, AC power would be limited to supply the DC demand up to it's maximum.

In one embodiment, the power generation system includes a thermal sensor 238 located at the battery pack 228 to provide battery temperature information to the processor 240. Based on the battery temperature information received from the thermal sensor 238, the processor regulates the battery charge voltage level such that the battery pack 228 is recharged in an optimal charging condition to maximize battery life and minimize battery recharge time. In response to control signals sent by the processor 240, the bi-directional power supply circuit 226 is capable of controlling the level of charging current applied to the battery pack 228. Additionally, a thermal sensor 206 is provided at the generator 202 to enable the processor to monitor the temperature of the generator. If the processor determines that the temperature of the generator 202 exceeds a certain value, the generator is shut off. In one implementation, the generator is turned off by eliminating the excitation voltage thereto.

In one aspect of the invention, the power generation system is capable of supplying AC and/or DC power even when the engine is turned off. For example, when the power generation system is used to provide electrical power at a stationary location, there may be occasions when the running of the vehicle's engine is not desired. In such situations, all of the energy received by the power bus is supplied by the electrical energy stored in the battery pack. In this regard, to supply AC load, the processor 240 will send appropriate control signals to the bi-directional power supply circuit 226 to convert electrical power from the battery 228 to charge the power supply bus 210 to maintain the power bus voltage level within a desired voltage range. In this mode, DC power is supplied directly from the battery pack.

Figure 2A:
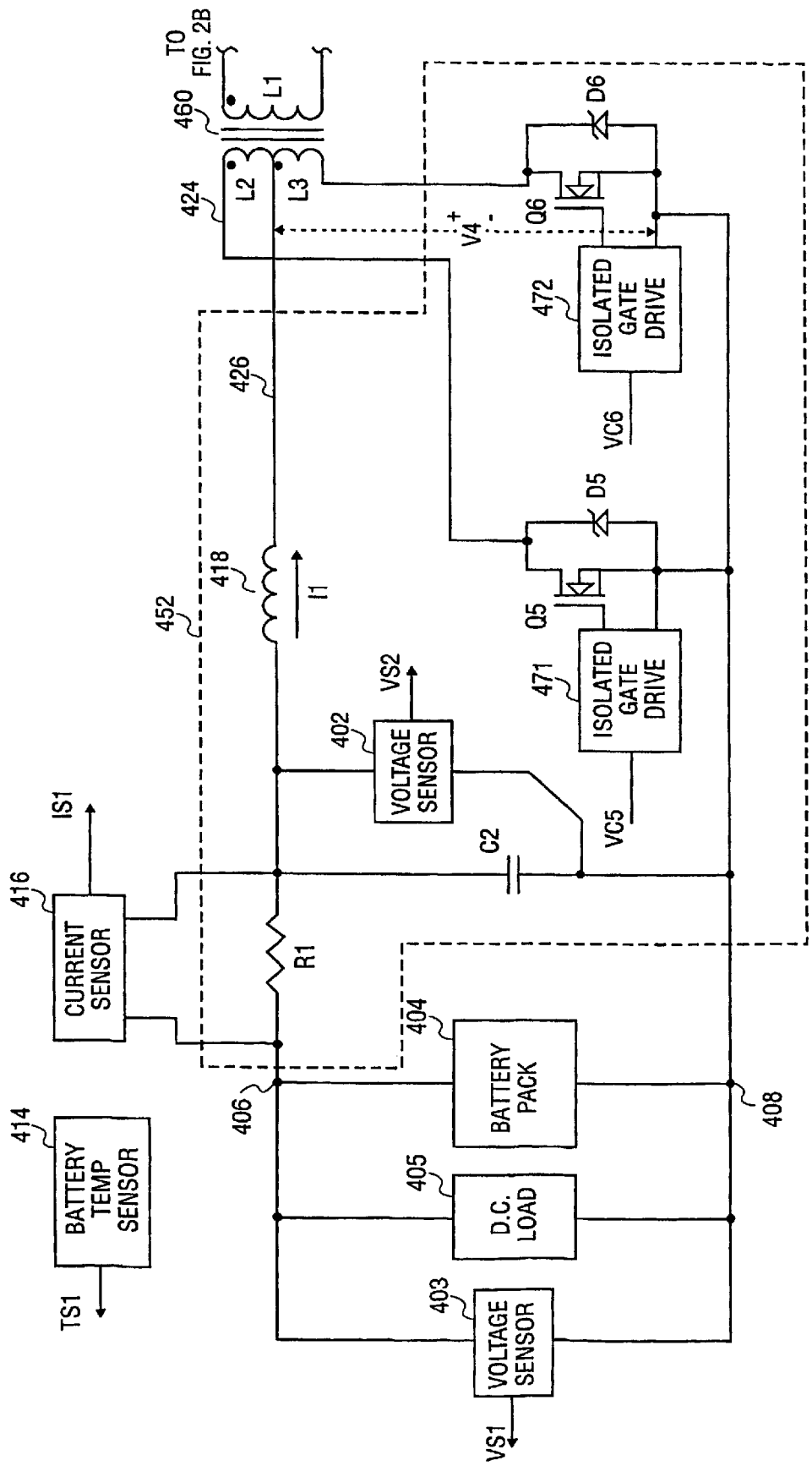
FIGS. 2A and 2B are schematic diagrams of a bi-directional conversion unit according to one embodiment of the invention.
Figure 2B:
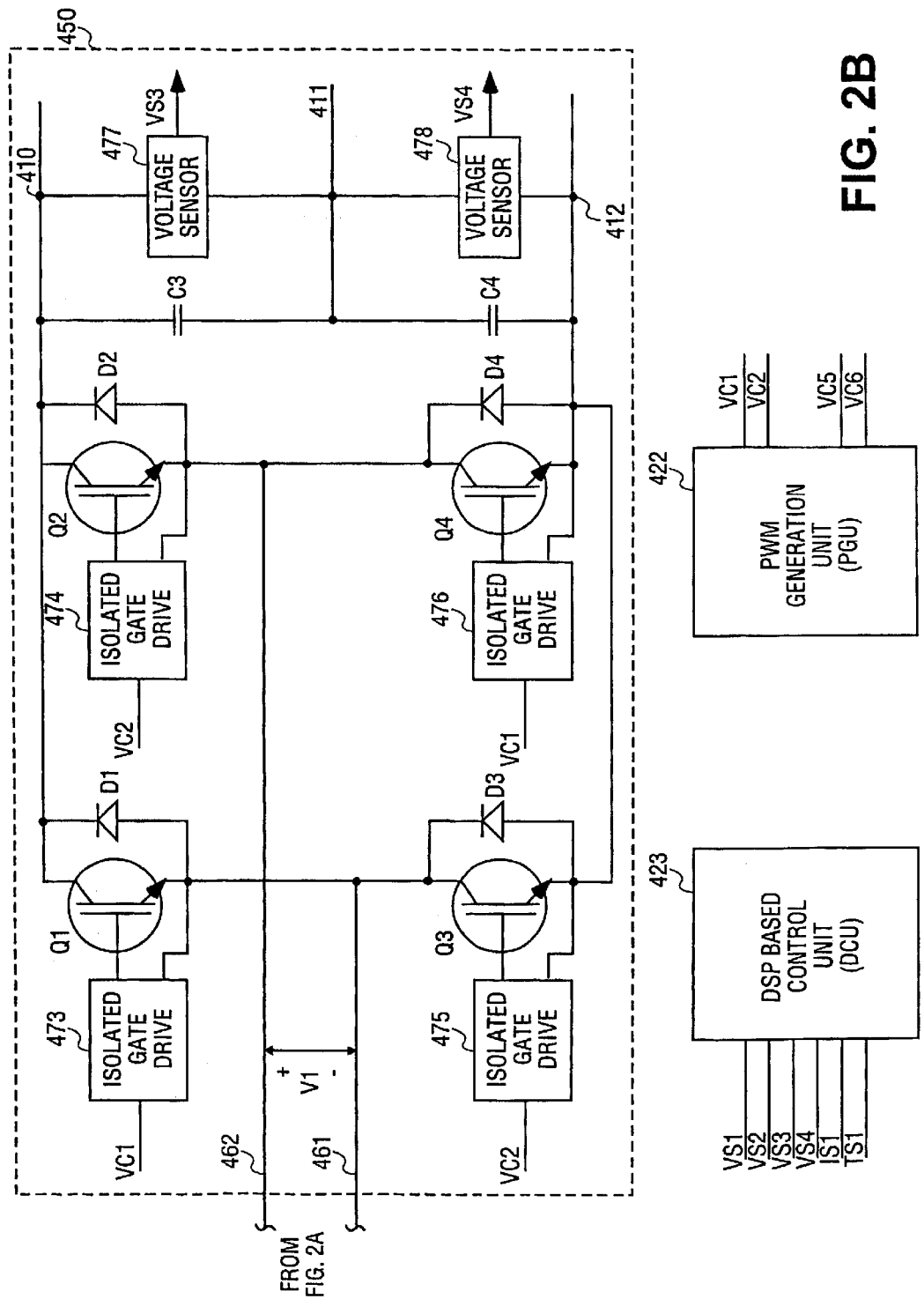

FIGS. 2A and 2B illustrate in schematic diagram form a bi-directional conversion unit (BCU) according to one embodiment of the invention. The bi-directional conversion unit according to the invention has various possible applications and may be used with the power generation system shown in FIG. 1A. In general, the bi-directional power supply circuit can be used to control the direction and the amount of the electrical power flow between two sources, such as for example, a generator and a battery pack. In the illustrated embodiment, the bi-directional power flow path is provided to derive electrical power from the battery to charge the power bus and subsequently share or solely supply power to the load connected to the power bus, or, depending on the available power, derive electrical power from the power bus to charge the battery and supply power to a DC load.

In the illustrated embodiment, the bi-directional power converter unit comprises a first subcircuit 450 coupled to a second subcircuit 452 via a transformer 460, a PWM generator unit (PGU) 422 and a DSP based control unit (DCU) 423. The first subcircuit 450 is coupled between the power bus terminals 410, 412 and the primary winding L1 of the transformer and serves as an H-bridge converter on the power bus side, wherein net current flow direction depends on voltages in the system and timings of the switching control waveforms. In the illustrated embodiment, the first subcircuit 450 comprises four power transistors, such as insulated gate bipolar transistors (IGBT) designated Q1, Q2, Q3 and Q4, acting as switches. Each of transistors Q1–Q4 is connected in parallel with a diode D1, D2, D3 and D4, respectively. The transistors Q1 and Q3 are connected in series and coupled to a first terminal 461 of a primary transformer winding L1. Similarly, the transistors Q2 and Q4 are connected in series and coupled to a second terminal 462 of the primary transformer winding L1.

The second subcircuit 452 is coupled between the battery terminals 406, 408 and the secondary transformer windings L2, L3 and serves as a combination of boost and buck converter on the battery bus side terminals 406 and 408. In the illustrated embodiment, the second subcircuit 452 comprises two transistors, such as MOSFET Q5 and Q6, an inductor 418 and a capacitor C2. The transistors Q5 and Q6 are coupled to end taps 424,428 of the secondary transformer winding while the inductor 418 is coupled to the center tap 426 of the secondary winding. In the illustrated embodiment, MOSFET transistors Q5, Q6, each having a built-in zener diode D5, D6, are utilized. The transistors Q1–Q6 are controlled by control signals generated by a logic block, PWM generator unit (PGU) 422. The PGU logic block generates synchronized control waveforms for bi-directional operation of the power conversion circuit.

Figure 7:
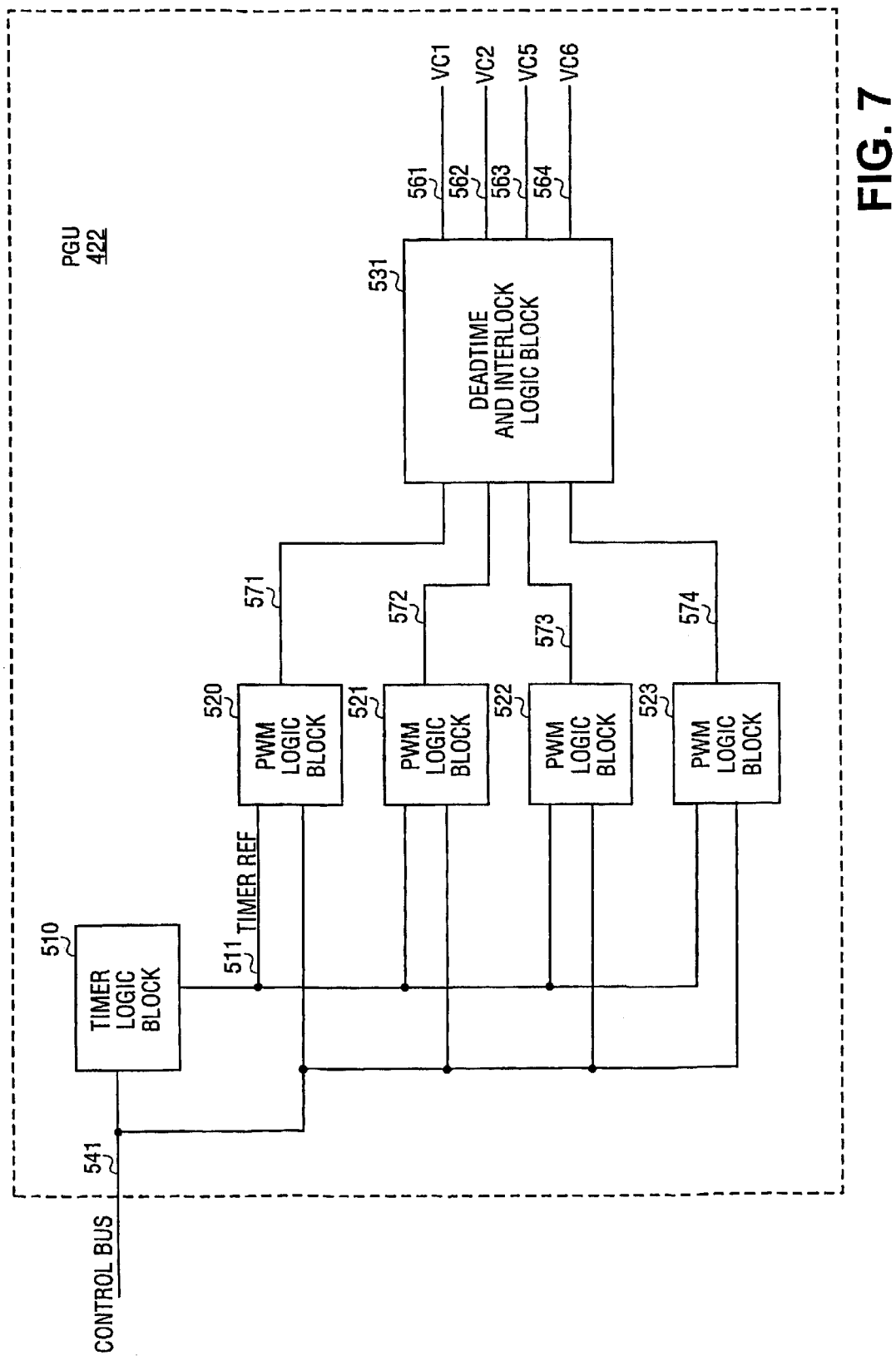
FIG. 7 is an internal block diagram of a PWM generation unit according to one embodiment of the invention.

FIG. 7 illustrates a block diagram of the PGU 422 according to one embodiment of the invention. The PGU 422 comprises a timer logic block 510, four identical pulse width modulation (PWM) logic blocks 520, 521, 522 and 523, and a deadtime and interlock logic block (DILB) 531. The timer logic block 510 generates periodic synchronizing signals on its output terminal 511 and determines operating frequency of the PWM control signals VC1, VC2, VC5 and VC6 on PGU output terminals 561, 562, 563 and 564, to drive transistors Q1 to Q6.

The first pair of PWM logic blocks 520 and 521 generate control signals 571 and 572 with timings intended to control transistors Q1 and Q2. These signals can produce conduction periods for Q1 and Q2 ranging from set minimum non-overlapping to a maximum, which has a portion of overlap duration. This allows the second subcircuit 452 to operate in combination of buck and boost conversion any time without any mode switching.

The second pair of PWM logic blocks 522 and 523 generates control signals 573 and 574 intended to control transistors Q1, Q2, Q3 and Q4. There are two signals out of these blocks and each is intended to control two of the four transistors to implement a full bridge converter 450. These signals can produce a conduction period for each set of transistors from a set minimum non-overlapping to a set maximum non-overlapping pulse every PWM cycle. The starting and ending points in time for these conduction periods are controlled according to an algorithm to maintain bi-directional energy flow path at all times.

The deadtime and interlock logic block (DILB) 531 ensures that the control waveforms on terminals 561, 562, 563 and 564 reaching transistors Q1 to Q6 always conform to the switching delay specifications of these transistors.

The real-time control of the first and second subcircuits of the BCU shown in FIGS. 2A and 2B is achieved by the functional block DCU 423, which incorporates control and monitoring algorithms to realize stable bi-directional function of the BCU 106 in one of the embodiments.

Figure 6:
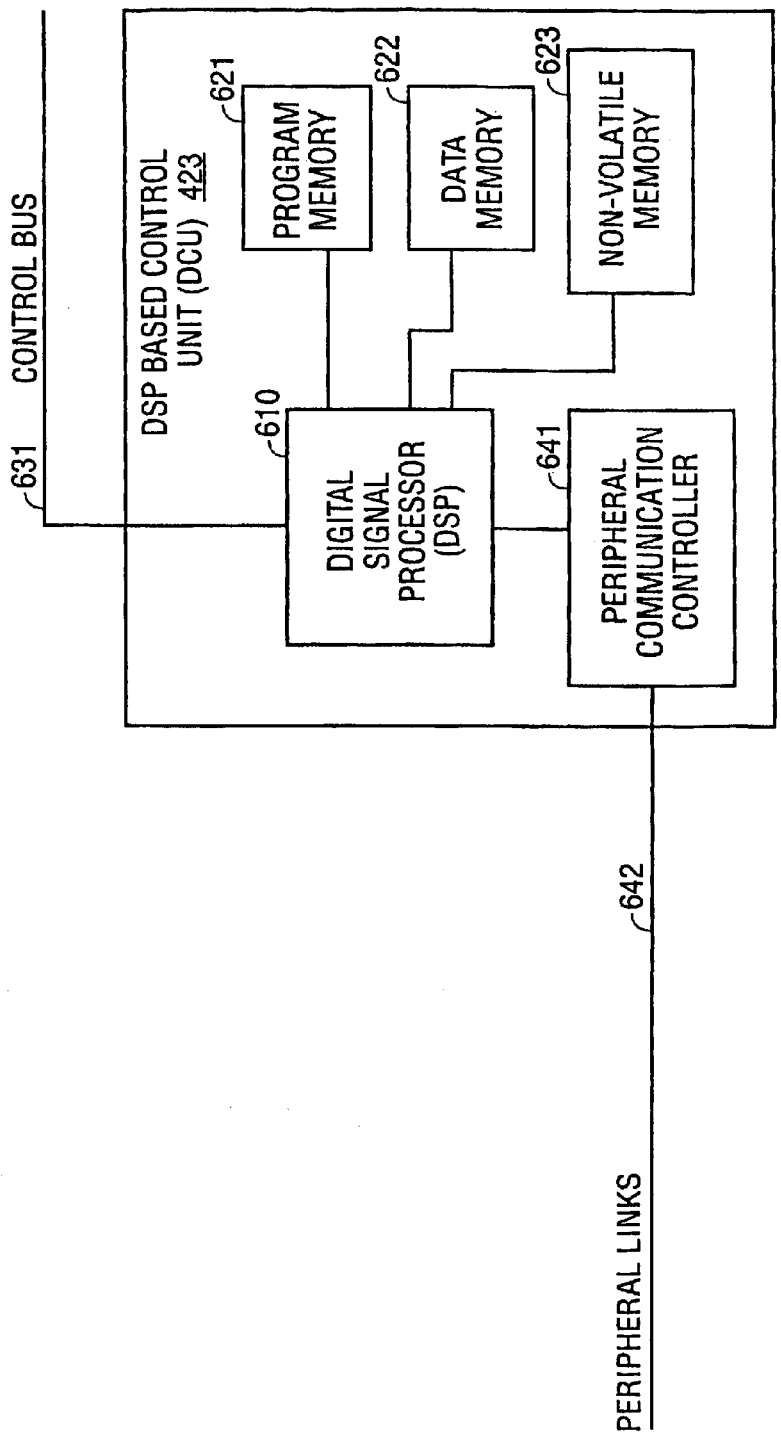
FIG. 6 is an internal block diagram of a DSP based control unit according to one embodiment of the invention.

FIG. 6 shows a block diagram of the DSP based control unit (DCU) 423 according to one embodiment of the invention. The DCU comprises a digital signal processor (DSP) 610 capable of executing numeric and logic computations at speed exceeding several thousand times the underlying sample rate of the control algorithms, compatible speed program memory 621 and data memory 622, to hold execution code and runtime variable data, non-volatile memory 623 to hold system parameters and a peripheral communication processor 641 for providing access to and from components external to the BCU 106. A dedicated internal high speed control bus 631 is provided for exchanging data with the PGU 422 and other hardware elements in the system, including voltage and current sensors and protection logic.

In one embodiment, the DCU 423 commands PGU 422 with appropriate values for PWM synchronizing signal at terminal 511, and starting and ending points of the waveforms at terminals 561, 562, 563 and 564 to be sent to transistors Q1 to Q6. DCU 423 is capable of generating these signals every period of synchronizing signal. In one implementation, the frequency for synchronizing signal is set above 75 KHz, as a result of which significant reduction in size and weight of magnetic components 460 and 418 has been achieved.

In one embodiment, the DCU 423 monitors various parameters such as the readings from a battery temperature sensor 414, the voltage level of the battery 404 and DC load 405 read by a voltage sensor 403, the amount and direction of current flowing through a shunt resistor R1 read by a current sensor 416, voltage level on the power bus read by voltage sensors 477 and 478 and operator commands from the user interface 112 and based on these parameters, generates appropriate signals to properly command waveforms to PGU 422, to drive the transistors Q1–Q6.

The operations of the bi-directional power converter circuit will now be described with reference to FIGS. 2A to 7. Since there is no specific charge or invert mode in the system, timing diagrams will be based on net energy flow basis; (1) a moment when net flow is towards the battery 404 and DC load 405, (2) a moment when net energy flow is towards the power bus terminals 410 and 412 and (3) a moment when net flow is near zero or transitioning between the two.

Figure 3:
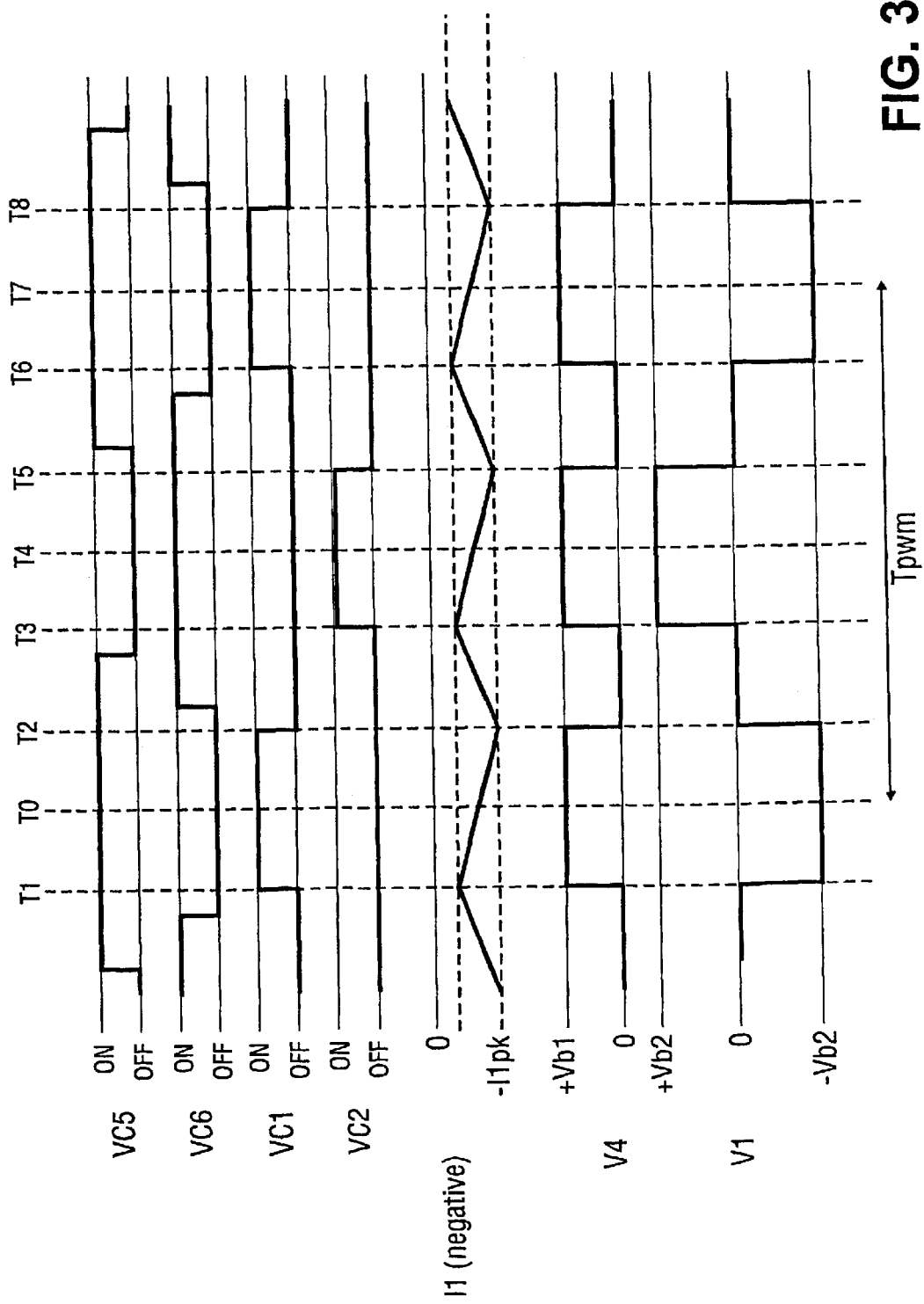
FIG. 3 is a timing diagram of the bi-directional conversion unit of FIGS. 2A and 2B during net energy flow from power supply bus to the battery.

The timing diagram in FIG. 3 depicts operations of the bi-directional power supply circuit during a PWM cycle (Tpwm) when the current I1 in the inductor 418 continues to flow towards the battery 404 and the DC load 405. Under this condition, electrical energy flows from the first subcircuit 450 to the second subcircuit 452 and according to the voltage across inductor 418, the magnitude of current I1 will only rise when one of the transistor switch pairs in the first subcircuit 450 is conducting. As illustrated in FIG. 3, at instant T1, control signal VC1 is set to turn ON transistors Q1 and Q4 thereby allowing a conduction path for energy flow. From T1 to T2 this conduction remains in effect and according to bi-directional algorithm, other control signals VC2, VC5 and VC6 are set such that proper current path exists across the subcircuits 450, 452 and transformer 460. Additional benefit is achieved by keeping transistor Q5 in conduction state thereby providing lower resistance path for the current I1. At T2 this conduction period ends and negative current I1 through the inductor 418 is allowed to fall until the beginning of next half cycle of conduction commencing at T3. As illustrated in FIG. 3, at instant T3, control signal VC2 is set to turn ON transistors Q2 and Q3 thereby allowing a conduction path for energy flow. From T3 to T5 this conduction remains in effect and according to bi-directional algorithm, other control signals VC1, VC5 and VC6 are set such that proper current path exists across the subcircuits 450, 452 and transformer 460. Again a benefit is achieved by keeping transistor Q6 in conduction state thereby providing lower resistance path for the current I1. At T5 this conduction period ends and negative current I1 through the inductor 418 is allowed to fall again until the beginning of next full cycle of conduction commencing at T6. Waveform during this cycle generated across terminals 461 and 462 is shown in FIG. 3 as V1 and for terminals 426 and 408 as V4.

Figure 4:
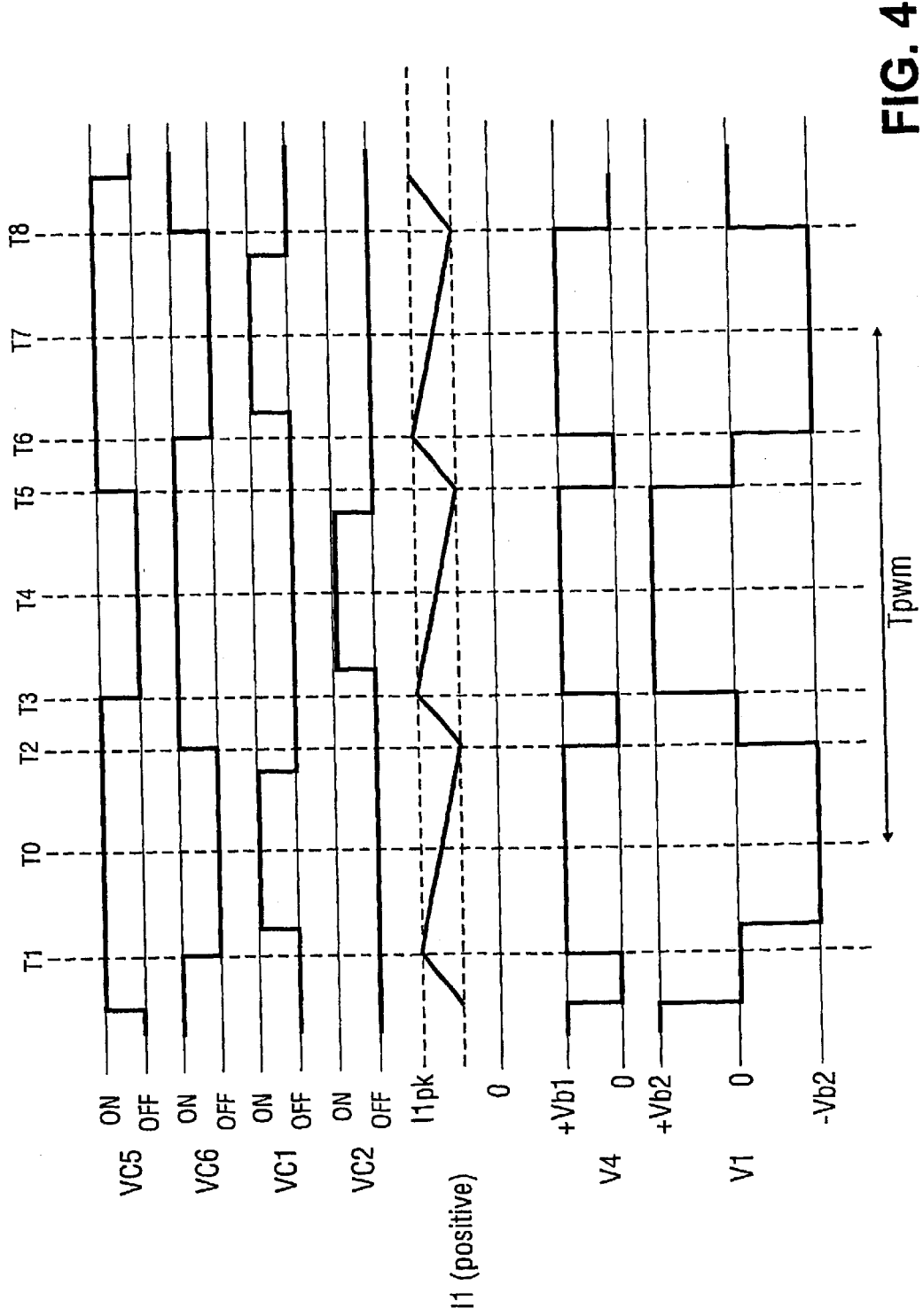
FIG. 4 is a timing diagram of the bi-directional conversion unit of FIGS. 2A and 2B during net energy flow out of the battery to the power supply bus.

The timing diagram in FIG. 4 depicts operations of the bi-directional power supply circuit during a PWM cycle (Tpwm) when the current I1 in the inductor 418 continues to flow out of the battery 404 and the DC load 405. Under this condition, electrical energy flows from the second subcircuit 452 to the first subcircuit 450 and according to the voltage across the inductor 418, the current I1 will only rise when only one the transistors Q5 and Q6 in the second subcircuit 452 is conducting. As illustrated in FIG. 4, at instant T1, control signal VC6 is set to turn OFF transistor Q6 while Q5 remains ON, thereby allowing a conduction path for energy flow. From T1 to T2, this conduction remains in effect and according to bi-directional algorithm of the invention, other control signals VC1 and VC2 are set such that proper current path exists across the subcircuits 450, 452 and transformer 460. During this period diodes D1 and D4 are conducting to complete the circuit for current in the first subcircuit 450. At T2, this conduction period ends and positive current I1 through the inductor 418 is allowed to rise by virtue of VC5 and VC6 set to turn ON both the transistors Q5 and Q6, this continues until the beginning of next half cycle of energy transfer commencing at T3. As illustrated in FIG. 4, at instant T3, control signal VC5 is set to turn OFF transistor Q5 while Q6 remains ON, thereby allowing a conduction path for energy flow. From T3 to T4, this conduction remains in effect and according to bi-directional algorithm of the invention, other control signals VC1 and VC2 are set such that proper current path exists across the subcircuits 450, 452 and transformer 460. During this period diodes D2 and D3 are conducting to complete the circuit for current in the subcircuit 450. At T5 this conduction period ends and again, positive current I1 through the inductor 418 is allowed to rise by virtue of VC5 and VC6 set to turn ON both the transistors Q5 and Q6, this continues until the beginning of next full cycle of energy transfer commencing at T6. Waveform during this cycle generated across terminals 461 and 462 is shown in FIG. 3 as V1 and for terminals 426 and 408 as V4.

Figure 5:
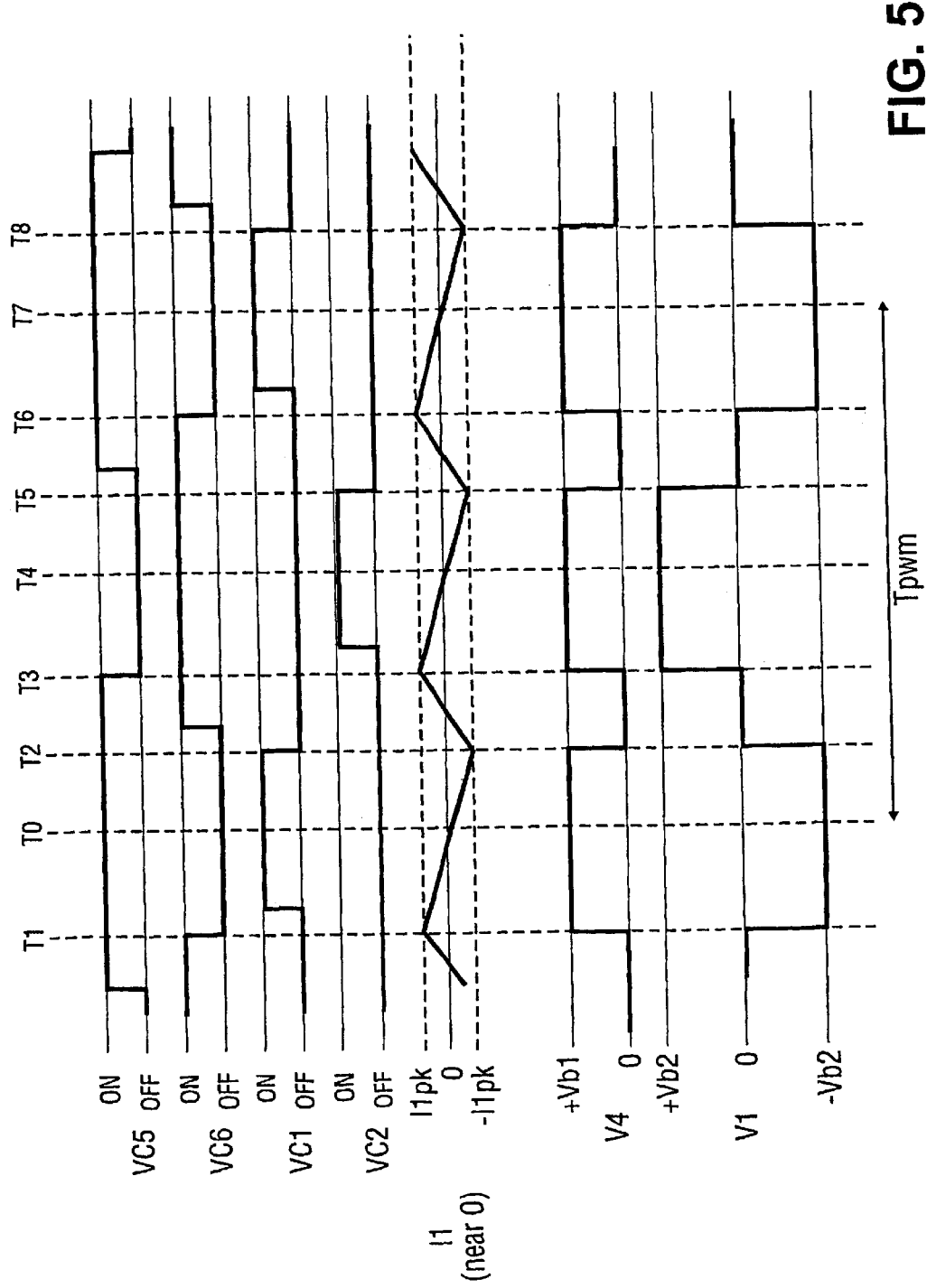
FIG. 5 is a timing diagram of the bi-directional conversion unit of FIGS. 2A and 2B during a transition of energy flow direction, i.e. very small net energy flow.

The timing diagram in FIG. 5 depicts operations of the bi-directional power supply circuit during a PWM cycle (Tpwm) when the net current I1 in the inductor 418 is near zero and it may change direction within a PWM cycle. This means that, during a part of the cycle, the current I1 may flow from the battery 404 to the power bus and during other part of the cycle, the current I1 may flow from the power bus to the battery 404 and DC load 405. As illustrated, just before the instant T1, there is a small amount of current present in the inductor 418. At T1, VC6 is set to turn OFF Q6 while Q5 is still ON. Therefore a path is opened for energy transfer across the subcircuits 450 and 452. Since the current I1 is positive, energy flows towards the first subcircuit 450 and current starts to drop until it reaches zero. Additionally, since at this moment by virtue of VC1, Q1 and Q3 are in ON state, energy can start flowing back from the first subcircuit 450. The current I1 through inductor 418 continues to increase negatively until T2, when VC1 causes transistors Q1 and Q3 to turn OFF thereby closing the energy path from the first subcircuit 450, resulting in fall of negative current I1 through 418. This turns into positive current and reaches its peak value at T3 when next half cycle repeats the process. Also illustrated in FIG. 5 are the waveforms V4 appearing across terminals 426 and 408 and V1 shows for terminals 462 and 461.

Figure 8:
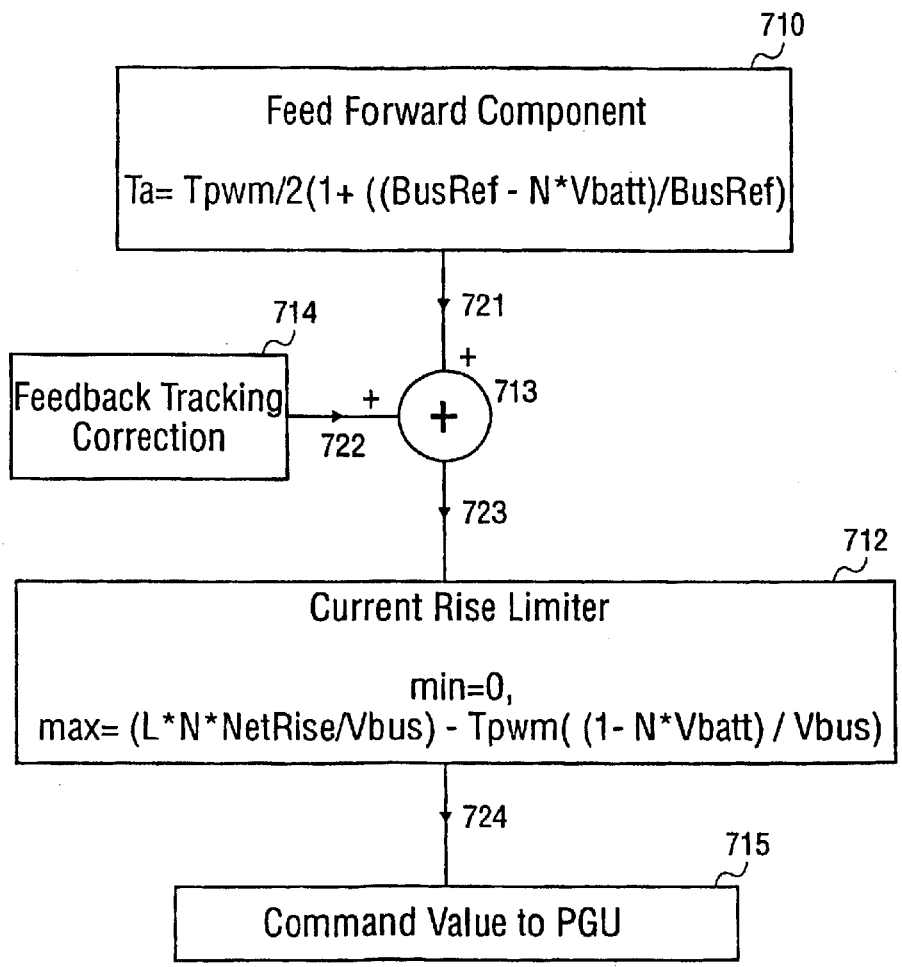
FIG. 8 is a block diagram of a feed forward based control and a current-rise limiter incorporated in the DSP based control unit.

FIG. 8 shows a block diagram of a feed forward based control and a current-rise limiter incorporated in the DSP based control unit according to one embodiment of the invention. The feed forward component 710 provides a high degree of stability to the power bus voltage across terminals 410 and 412. As shown, it also includes a correction signal 722 from a slow tracking feedback correction 714 adding precision to the same.

The feed forward component 710 is an estimate of pulse width required to maintain desired power bus voltage across 410 and 412 thereby eliminating delays and transient response associated with pure feedback based control loops. A small correction signal 722 is added to remove small errors caused by losses in the circuit which are generally dependent on factors like amount of load shared by battery pack 404, temperature and component tolerances etc. In the illustrated embodiment shown in FIG. 8, the feed forward component is computed as follows:

$$Ta = Tpwm/2(1+((BusRef - N*Vbatt)/BusRef) \qquad (1)$$

where BusRef represents a desired voltage across power bus terminals 410 and 412;

N represents a ratio of number of turns of transformer 460 on L1 side to L3 side; and Vbatt represents a current voltage level across battery terminals 406 and 408.

Figure 9:
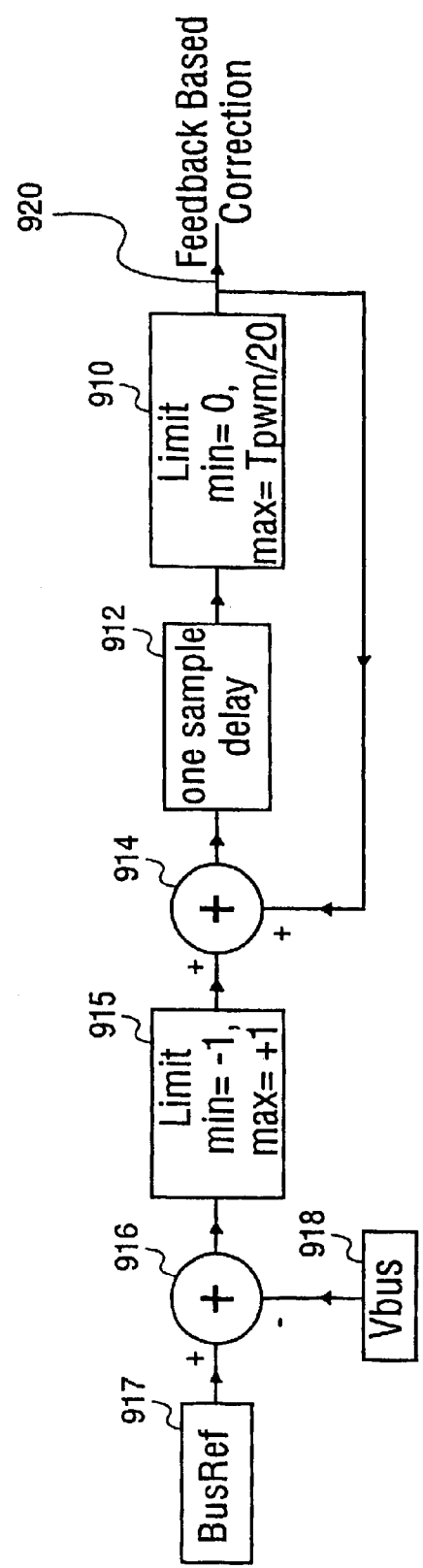
FIG. 9 is a block diagram of a feedback tracking correction of FIG. 8.

FIG. 9 shows a block diagram of the feedback tracking correction of FIG. 8 according to one embodiment of the invention. The feedback correction signal 920 is generated by cumulatively adding small errors computed by comparing the desired power bus voltage (BusRef) 917 with the actual power bus voltage (Vbus) 918. Only sign of this error is carried on so that feedback is not dominant and also slowing down the accumulation to achieve precise tracking of the bus voltage (Vbus) 918 appearing across the power bus terminals 410 and 412. Accumulation is implemented by blocks 914, 912 and 910 and includes a limiter to limit effect of the feedback based correction signal 920.

Referring back to FIG. 8, the feedback corrected signal 723 passes through a current rise limiter 712. The purpose of the current rise limiter 712 is to estimate current rise every PWM cycle and limits its output signal 724 to keep current rise to the limits set by the system parameters. The result of the function performed by the current rise limiter 712 is that surge inrush peak current value of I1 in inductor 418 is automatically controlled to be within the desired limits. The output signal 724 is translated to a suitable format by the block 715 and sent to PGU 422.

Figure 10:
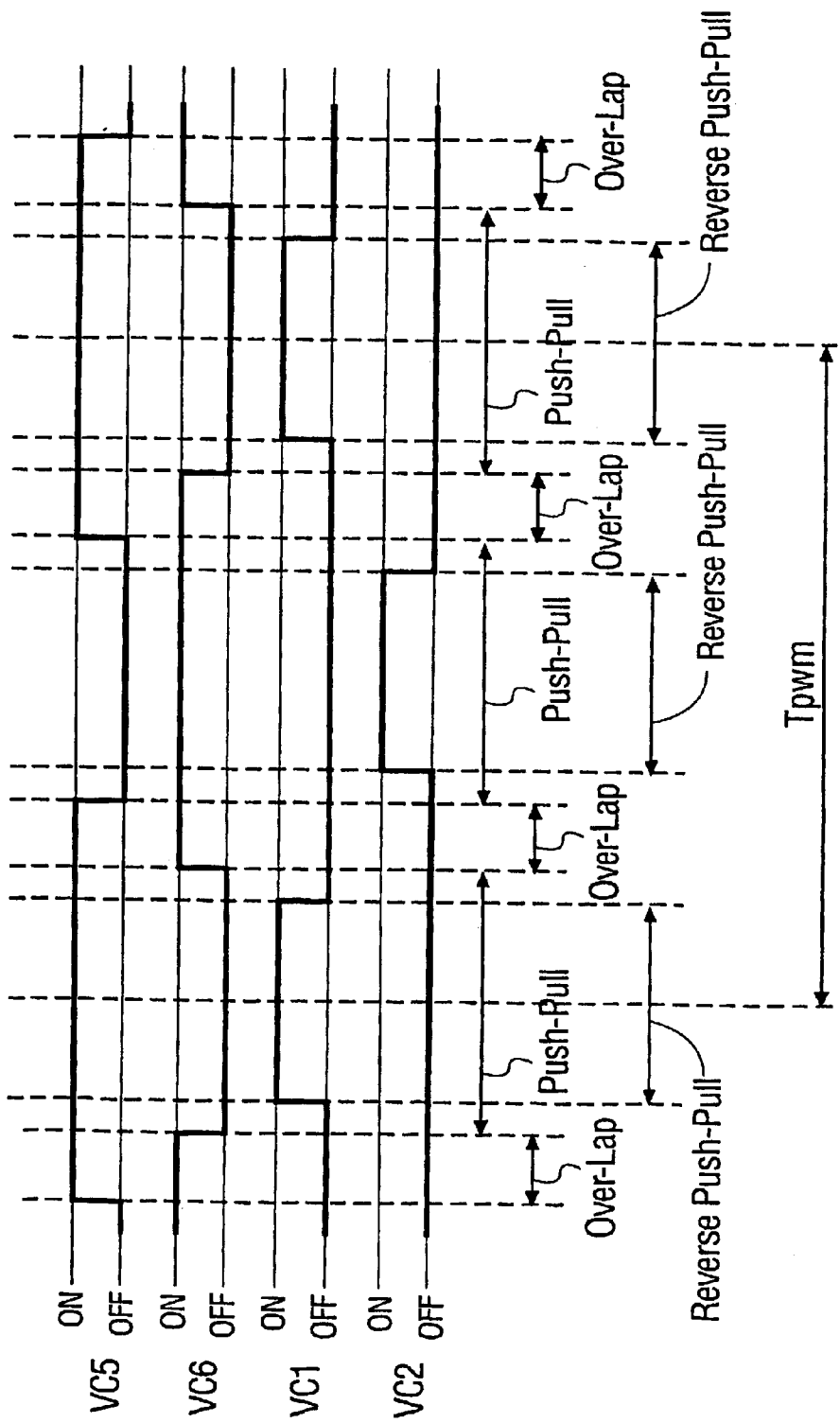
FIG. 10 is a timing diagram of control signals generated by the PWM generation unit according to one embodiment of the invention.

The timing diagram in FIG. 10 shows control signals VC5, VC6, VC1 and VC2 generated by the PWM generation unit according to one embodiment of the invention. Each pulse width modulation time period (Tpwm) consists of "overlap section" and "push-pull section." As seen by referring to FIG. 10, each push-pull section contains a subsection referred to as a "reverse push-pull subsection." The overlap sections in FIG. 10 are defined as duration of time when control signals VC5 and VC6 are both turned ON. The push-pull sections are defined as the remainder of the time within the time period (Tpwm). In other words, a push-pull section may be defined as a time period when only one of control signals VC5 and VC6 is turned ON. The reverse push-pull subsection is defined as duration of time within a push-pull section when one of the control signals VC1 and VC2 is turned ON. As can be seen in FIG. 10, periods of overlap sections and push-pull sections are exclusive in time.

From bi-directional power conversion point of view, the width of the reverse push-pull subsections controls energy transfer from the power bus to the battery, whereas the width of overlap sections plus remaining parts of the push-pull sections controls energy transfer from the battery to the power bus. Hence, by controlling the ratio of these sections, the desired direction and the amount of energy transfer between the battery and the power bus can be achieved. In other words, the desired direction and the amount of electrical power flowing through the bi-directional power supply circuit can be controlled by varying the width of the reverse push-pull subsection and the width of push-pull section within a PWM cycle period (Tpwm).

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A power generation system comprising:
   a generator to generate electrical power;
   a DC storage or source device (DCSSD);
   a power bus coupled to said generator; and
   a bi-directional conversion unit coupled between said power bus and said DCSSD, said bi-directional conversion unit comprising a bi-directional circuit having switching elements, and a controller to generate control signals to selectively activate the switching elements to control a direction and amount of electrical power flowing between said DCSSD and the power bus through said bi-directional current circuit, wherein in a first direction power flows from said power bus to said DCSSD and in a second direction power flows from said DCSSD to said power bus.

2. The system of claim 1, wherein said DCSSD is a battery.

3. The system of claim 2, wherein electrical power demanded by a load applied to the system is supplied by at least one of said generator and said battery via said power bus.

4. The system of claim 2, wherein electrical power demanded by a load applied to the system is supplied by said power bus without an interruption during transitioning of said bi-directional conversion unit from said first direction of power flow to said second direction of power flow.

5. The system of claim 2, wherein, when the generator is actively generating electrical power, battery power is used to compensate a for drop in the voltage level of the power bus, to provide power to a load without interruption in a situation selected from the group comprising when load demand increases, when the power bus is experiencing a load surge, and when said generator is being driven at low RPM.

6. The system of claim 1, further comprising an AC inverter coupled to receive DC power from said power bus and convert said DC power into AC power.

7. The system of claim 6, wherein electrical power generated by said generator supplies AC load when the AC inverter is turned and any remaining power that the AC load does not require is used to recharge said battery.

8. The system of claim 1, wherein said bi-directional conversion unit operates in said first direction of power flow when the voltage level of the power bus exceeds an upper threshold value and operates in said second direction of power flow when the voltage level of the power bus drops below a lower threshold value, said upper threshold value being set at a defined value below the power bus voltage level maintained by the controller when the generator is actively generating power.

9. The system of claim 2, further comprising a thermal sensor located at the battery to provide battery temperature information, wherein a battery charge current supplied to recharge the battery is regulated according to the battery temperature information.

10. The system of claim 1, further comprising a generator drive coupled between the generator and the power bus, said generator drive capable of adjusting the output power of the generator.

11. The system of claim 10, further comprising a rotational speed sensor coupled to said generator and output therefrom is input to a processor, wherein said processor controls the output power generated by the generator via the generator drive to match the electrical power supplied to loads.

12. The system of claim 11, wherein said processor is configured to determined if the generator is capable of producing sufficient power to match the power demanded by the loads, wherein if the current generator rotational speed is inadequate to meet the load demand, the processor is configured to send control signals to vary the speed of a drive device supplying mechanical force to the generator.

13. A power generation system comprising:
   a generator to generate electrical power;
   an electronic control unit coupled to said generator, said electrical control unit containing a power supply bus; and
   a bi-directional conversion unit comprising a bi-directional power supply circuit coupled between said power bus and a battery, said bi-directional power supply circuit capable of transitioning between a first direction wherein electrical power flows from said power bus to a battery and a second direction wherein electrical power flows from said battery to said power bus.

14. The power generation system of claim 13, wherein said electronic control unit further comprises a generator drive to selectively adjust the power produced by the generator.

15. The power generation system of claim 13, wherein said electrical control unit further comprises an AC inverter coupled to receive DC power from said power bus and convert said DC power into AC power.

16. The power generation system of claim 15, further comprising a battery pack coupled to said bi-directional conversion unit, wherein electrical power generated by said generator supplies AC load and any remaining power that the AC load does not require is used to recharge said battery pack.

17. The power generation system of claim 16, wherein, when the generator is actively generating electrical power, battery power stored in said battery pack is used to compensate for a drop in the voltage level of the power bus, to provide power to a load without interruption in a situation selected from the group comprising when load demand increases, when the power bus is experiencing a load surge, and when said generator is being driven at low RPM.

18. The power generation system of claim 13, which includes the ability to derive power from both said generator and said battery pack to prevent AC voltage brownouts when power devices that require high levels of temporary power.

19. The power generation system of claim 13, which includes an idle control that sets the vehicle's idle speed, working in conjunction with said inverter charger unit such that when high power levels is demanded, additional power is derived from said battery pack via the bi-directional power supply, eliminating sudden application of torque by said generator and thus eliminating engine RPM fluctuations.

20. The power generation system of claim 13, further comprising a thermal sensor for monitoring the temperature of the batteries in said battery pack, and adjust the recharge voltage level established in said inverter charger unit such that the batteries are recharged in an optimal way to extend said battery pack life and maximum amount of stored charge.

21. A method of generating power comprising:
   generating electrical power;
   charging a power bus using the electrical power generated;
   charging a battery using the electrical power from said power bus if a voltage level of said power bus exceeds an upper threshold value;

charging said power bus using the electrical power from said battery if the voltage level of said power bus drops below a lower threshold value; and adjusting the electrical power generated if load demand exceeds the electrical power generated and the electrical power supplied by the battery.

22. The method of claim 21, wherein said electrical power is generated by a generator which is driven by an engine.

23. The method of claim 22, further comprising adjusting said electrical power generated by operating said generator by varying AC voltage level applied to generator stator coils while maintaining optimum slip in order to maintain the power bus within a defined voltage range.

24. The method of claim 22, further comprising adjusting said electrical power generated by adjusting the speed of the engine driving the generator in order to maintain the power bus within a defined voltage range.

25. The method of claim 21, further comprising providing AC and DC electrical power simultaneously, a power supply controller coupled between said at least one electrical storage device and said at least one electrical source device to control the flow of electrical energy between said storage device and said source device and to control the flow of electrical energy demanded by said at least one load from at least one of said storage and source devices; wherein said power supply controller comprises a power bus and a bi-directional conversion unit capable of transitioning between a first direction wherein electrical power flows from said power bus to said at least one electrical storage device and a second direction wherein electrical power flows from said at least one electrical storage device to said power bus.

26. A system comprising:

at least one electrical power storage device;

at least one electrical power source device;

at least one load; and a power supply controller coupled between said at least one electrical storage device and said at least one electrical source device to control the flow of electrical energy between said storage device and said source device and to control the flow of electrical energy demanded by said at least one load from at least one of said storage and source devices.

27. The system of claim 26, wherein said at least one electrical storage device is a battery and said at least one electrical source device is a generator.

28. The system of claim 26, wherein said at least one load comprises an AC load and a DC load.

* * * * *